United States Patent
Knight (10) Patent No.: US 8,160,971 B2
(45) Date of Patent: Apr. 17, 2012

(54) METHOD AND APPARATUS FOR MONITORING AN ORDER STATUS

(75) Inventor: Jared Knight, Martinez, GA (US)

(73) Assignee: Electrolux Home Products, Inc., Charlotte, NC (US)

( * ) Notice: Subject to any disclaimer, the term of this patent is extended or adjusted under 35 U.S.C. 154(b) by 285 days.

(21) Appl. No.: 12/261,957

(22) Filed: Oct. 30, 2008

(65) Prior Publication Data

US 2009/0144109 A1 Jun. 4, 2009

Related U.S. Application Data (60) Provisional application No. 60/983,740, filed on Oct. 30, 2007.

(51) Int. Cl.
- G06Q 30/00 (2012.01)
- G06Q 10/00 (2012.01)
- G06Q 20/00 (2012.01)
- G07B 15/00 (2011.01)
- G06F 17/00 (2006.01)

(52) U.S. Cl. ............. 705/330; 705/1.1; 705/13; 705/22; 705/26.64; 705/400

(58) Field of Classification Search ............... 705/1.1, 705/13, 22, 26, 330, 400
See application file for complete search history.

(56) References Cited

U.S. PATENT DOCUMENTS

| | | | |
|---|---|---|---|
| 5,117,364 A * | 5/1992 | Barns-Slavin et al. ....... 705/402 |
| 5,712,989 A | 1/1998 | Johnson et al. |
| 6,463,420 B1 * | 10/2002 | Guidice et al. ................. 705/28 |
| 7,020,618 B1 | 3/2006 | Ward |
| 7,177,825 B1 | 2/2007 | Borders et al. |
| 7,647,250 B2 * | 1/2010 | Abo-Hasna et al. ............ 705/26 |
| 2002/0013721 A1 | 1/2002 | Dabbiere et al. |
| 2002/0032612 A1 | 3/2002 | Williams et al. |
| 2002/0049622 A1 | 4/2002 | Lettich et al. |
| 2002/0147602 A1 | 10/2002 | Helms |
| 2002/0147654 A1 * | 10/2002 | Kraisser et al. ................. 705/26 |
| 2002/0165804 A1 | 11/2002 | Beebe et al. |
| 2002/0174032 A1 | 11/2002 | Chien |
| 2003/0061068 A1 | 3/2003 | Curtis |
| 2003/0115073 A1 | 6/2003 | Todd et al. |
| 2003/0212602 A1 * | 11/2003 | Schaller .......................... 705/22 |
| 2003/0212614 A1 | 11/2003 | Chu et al. |
| 2003/0229530 A1 | 12/2003 | Lai |
| 2003/0233294 A1 | 12/2003 | Luo et al. |
| 2004/0039576 A1 | 2/2004 | He et al. |
| 2004/0133438 A1 * | 7/2004 | Zeisset et al. ..................... 705/1 |
| 2004/0162768 A1 | 8/2004 | Snyder et al. |
| 2004/0181467 A1 | 9/2004 | Raiyani et al. |
| 2004/0249691 A1 | 12/2004 | Schell et al. |
| 2004/0267675 A1 * | 12/2004 | Burton et al. ................. 705/400 |

(Continued)

*Primary Examiner* — Fadey Jabr
(74) *Attorney, Agent, or Firm* — Pearne & Gordon LLP (57) ABSTRACT

A computerized system and method for monitoring an order placed by a customer for a product produced by a supplier to be delivered to a retail location. The method includes presenting an order-entry interface to collect order information about the order to be transmitted to the supplier and store the order information in a computer-accessible order database. Warehouse information authorized by the supplier and transmitted to the warehouse is also stored. A carrier database stores a shipping rate of carriers for transporting the product ordered by the customer to the retail location, and a report generation subsystem collects at least a portion of the order information, the warehouse information and the shipping rate and generates a report displaying the collected information in a single display to be substantially simultaneously reviewed by a supervisor.

13 Claims, 5 Drawing Sheets

U.S. PATENT DOCUMENTS

| | | |
|---|---|---|
| 2005/0015295 A1* | 1/2005 | McCulloch ............... 705/10 |
| 2006/0053027 A1 | 3/2006 | Riggs et al. |
| 2006/0241822 A1* | 10/2006 | Yadappanavar et al. ...... 701/5 |
| 2006/0277085 A1* | 12/2006 | Neumann ................ 705/8 |
| 2007/0038506 A1* | 2/2007 | Noble et al. ............ 705/13 |
| 2007/0073551 A1* | 3/2007 | Williams et al. ........... 705/1 |
| 2007/0100649 A1* | 5/2007 | Walker et al. ............ 705/1 |
| 2007/0162353 A1* | 7/2007 | Borders et al. ........... 705/26 |
| 2008/0027737 A1* | 1/2008 | Watkins ................ 705/1 |
| 2008/0255891 A1* | 10/2008 | Stone .................. 705/7 |

* cited by examiner

- Summary view of report created for Menlo to better manage tendering / shipping...

METHOD AND APPARATUS FOR MONITORING AN ORDER STATUS

CROSS-REFERENCE TO RELATED APPLICATIONS

This application claims the benefit of U.S. Provisional Application No. 60/983,740, filed Oct. 30, 2007, the entirety of which is incorporated herein by reference.

COPYRIGHT NOTICE

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by the law, but otherwise reserves all copyright rights whatsoever.

BACKGROUND OF THE INVENTION

1. Field of the Invention

This application relates generally to a method and apparatus for monitoring the progress of an order, and more specifically to a computer-automated method and apparatus for retrieving order information from a plurality of databases and presenting a report of the retrieved information substantially in real time to at least one of a vendor, a customer and a shipping company.

2. Description of Related Art

Typically, when a retailer orders a product in bulk from a manufacturer, the retailer manually places the order with a representative of the manufacturer. In turn, the manufacturer sends a request to a warehouse storing the ordered product, requesting the warehouse to prepare the suitable number of units of the ordered product and arrange for shipping of the product to the retailer that placed the order. The warehouse then contacts a freight company for shipping the product and schedules a pick up date for the shipment.

Although such an ordering process is simple, there is little communication between the manufacturer, warehouse and freight company, even though the warehouse may be operated by the manufacturer. And due to this lack of communication, the actions of any of these three parties can adversely affect the other two parties, resulting in late delivery of the ordered product to the retailer. When efforts are made to identify the source of an unexpected delay or other occurrence, identifying the source of the delay among the manufacturer, warehouse and freight company is difficult and time consuming. Further, making arrangements to have the ordered products transported to the retailer can require a significant amount of time. So much time is often required that making alternate arrangements upon learning that the initial shipping rates are higher than expected or that the initial shipment will be delayed is not practical.

Accordingly, there is a need in the art for a method and apparatus for presenting a consolidated source of information to at least a manufacturer, warehouse and shipping representative to minimize delays in the delivery of an ordered product to a customer. Such a method an apparatus can optionally be integrated with existing databases maintained by one or more of the manufacturer, warehouse and shipping representative, and can optionally present the information in a timely manner that allows for an alternate arrangement to be made in the event of a contingency.

BRIEF SUMMARY

According to one aspect, the subject application involves a method of monitoring a status of an order placed by a customer for a product produced by a supplier to be delivered to a retail location. The method includes collecting order information about the order from a computer-accessible order database included as part of an order routing system of the supplier and associating the order information with the order, wherein the order information includes information that identifies at least one of: the product to be delivered, a quantity of the product desired to be delivered, and a requested ship date. Warehouse information is to be collected from a computer-accessible warehouse database in communication with a warehouse management system and associating the warehouse information with the order, wherein the warehouse information comprises at least one of: a scheduled load date, a scheduled date of departure of the product from the warehouse, and a scheduled date of delivery of the product to the retail location. A low-cost carrier offering a lowest shipping rate relative to shipping rates offered by a group of available carriers for transporting the quantity of the product to the retail location is associated with the order. A report is then generated to display the order information, the warehouse information, the low-cost carrier and the lowest shipping rate associated with the order corresponding to a predetermined time, and the report is transmitted to be viewed in real-time by a supervisor.

According to another aspect, the subject application involves computerized system for fulfilling an order placed by a customer for a product produced by a supplier to be delivered to a retail location. The system includes an order-routing subsystem for presenting an order-entry interface to collect order information about the order to be transmitted to the supplier and store the order information in a computer-accessible order database. A warehouse management subsystem comprising a computer-accessible warehouse database is provided for storing warehouse information authorized by the supplier and transmitted to the warehouse storing a sufficient quantity of the product ordered by the customer, wherein the warehouse information comprises at least one of: a scheduled load date, a scheduled date of departure of the product from the warehouse, and a scheduled date of delivery of the product to the retail location. A carrier subsystem includes a carrier database and stores a shipping rate of a plurality of carriers for transporting the product ordered by the customer to the retail location. And a report generation subsystem collects at least a portion of the order information, the warehouse information and the shipping rate and generates a report displaying the portion of the order information, the warehouse information and the shipping rate collected in a single display to be substantially simultaneously reviewed by a supervisor.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Figure 1:
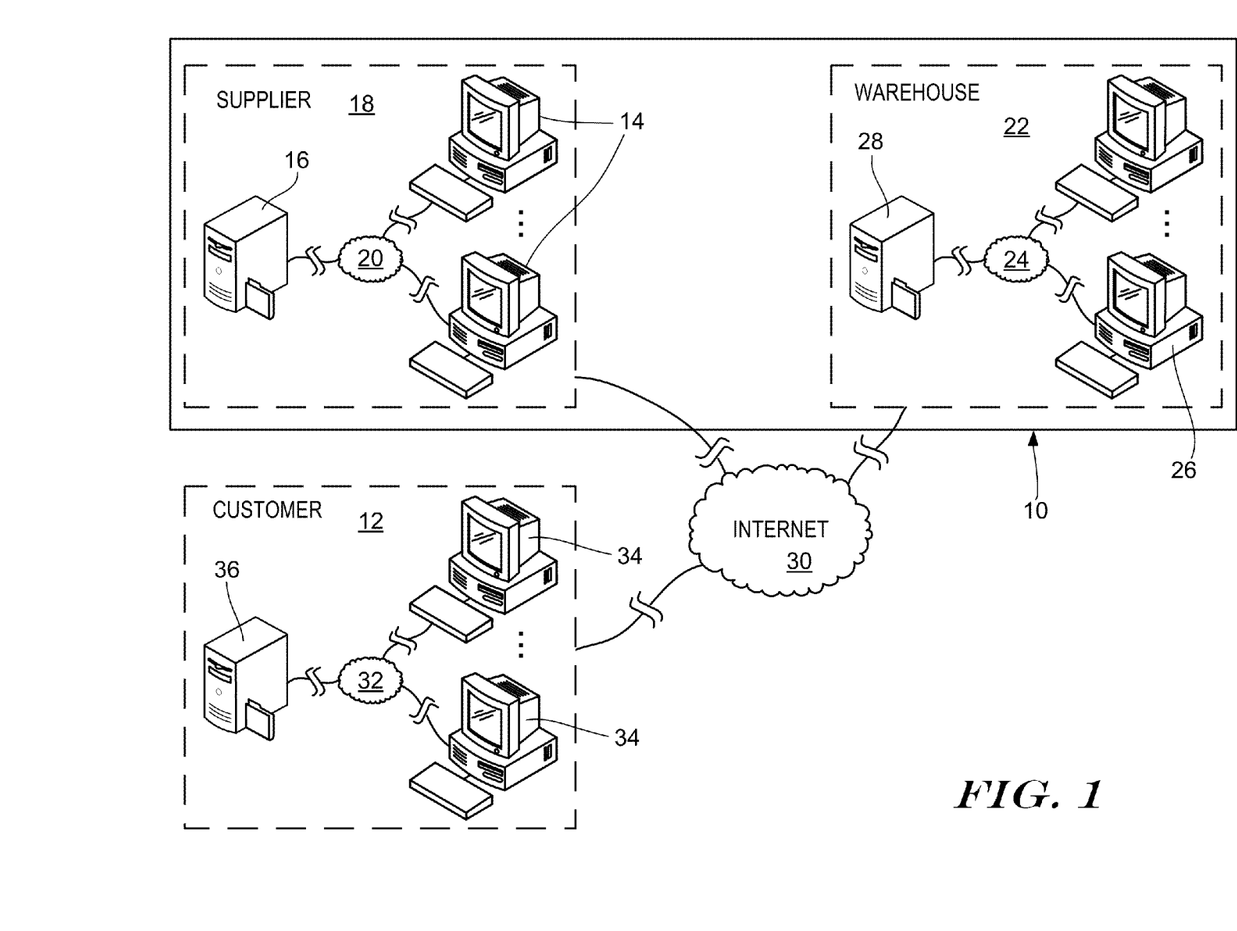
FIG. 1 is an illustrative example of a computerized system for fulfilling an order placed by a customer for a product produced by a supplier to be delivered to a retail location.

An illustrative embodiment of a system 10 for fulfilling and managing an order placed by a customer 12 is shown in FIG. 1. To clearly describe order placement and fulfillment, an illustrative order placed by a customer 12 for a quantity of home appliances to be delivered to a retail location for subsequent sale to retail consumers will be used. However, the scope of the present invention also includes orders placed with any supplier 18 by any customer 12 for any desired goods.

As shown in FIG. 1, the system 10 can be embodied by a network of computer terminals, servers and associated hardware and/or software for facilitating communications over a local communication network (referred to herein as a "LAN" 20), a public, wide area communication network such as the Internet, for example (referred to herein as a "WAN" 30), or both, between the various entities. The supplier 18, which can be the source or manufacturer of the goods ordered by the customer 12, is equipped with a server 16 storing order information in an order database, computer-executable code that can be accessed by one or more networked computer terminals 14 over the LAN 20, and other content to be served to the computer terminals 14 and optionally other terminals externally of the supplier 18.

A warehouse 22 storing a stock of the products sold by the supplier 18 is maintained and operated by, or on behalf of the supplier 18. The warehouse 22 may be affiliated with the supplier 18, or operated by an independent third party. Optionally, the warehouse 22 can be located on the supplier's premises, or remotely located relative to the supplier 18. Like the supplier 18, the warehouse 22 can include its own LAN 24 establishing a communication network operatively connecting one or more warehouse computer terminals 26 to a warehouse server 28. The warehouse server 28 used by the warehouse 22 can optionally be the same server 16 used by the supplier 18 to manage the entry of orders for the products, or can be a separate server that can communicate with the server 16 utilized by the supplier 18 over the WAN 30.

A customer 12, which can be a national retailer such as Sears, Home Depot, and Lowes, or a representative thereof, for example, typically include their own LAN 32 facilitating electronic communications between a plurality of customer computer terminals 34 and a customer server 36. Optionally, the customer 12 can place orders for the products with the supplier 18 from the customer computer terminals 34. The customer server 36 utilized by the customer 12 can optionally serve content to these computer terminals 34 thereby presenting an order form that can be filled out and subsequently transmitted to the supplier. According to alternate embodiments, the customer 12 can log into, and communicate directly with the server 16 over the WAN 30 and electronically provide order information required to fully describe the order for the products to be placed by the customer 12. According to other embodiments, the customer 12 can optionally verbally communicate an order for the products to the supplier 18 via telephone, place an order via e-mail, or otherwise communicate the order for the products in a manner that requires the supplier 18 to manually key the order information into the server 16 utilized by the supplier 18 via one of the computer terminals 14.

Figure 2:
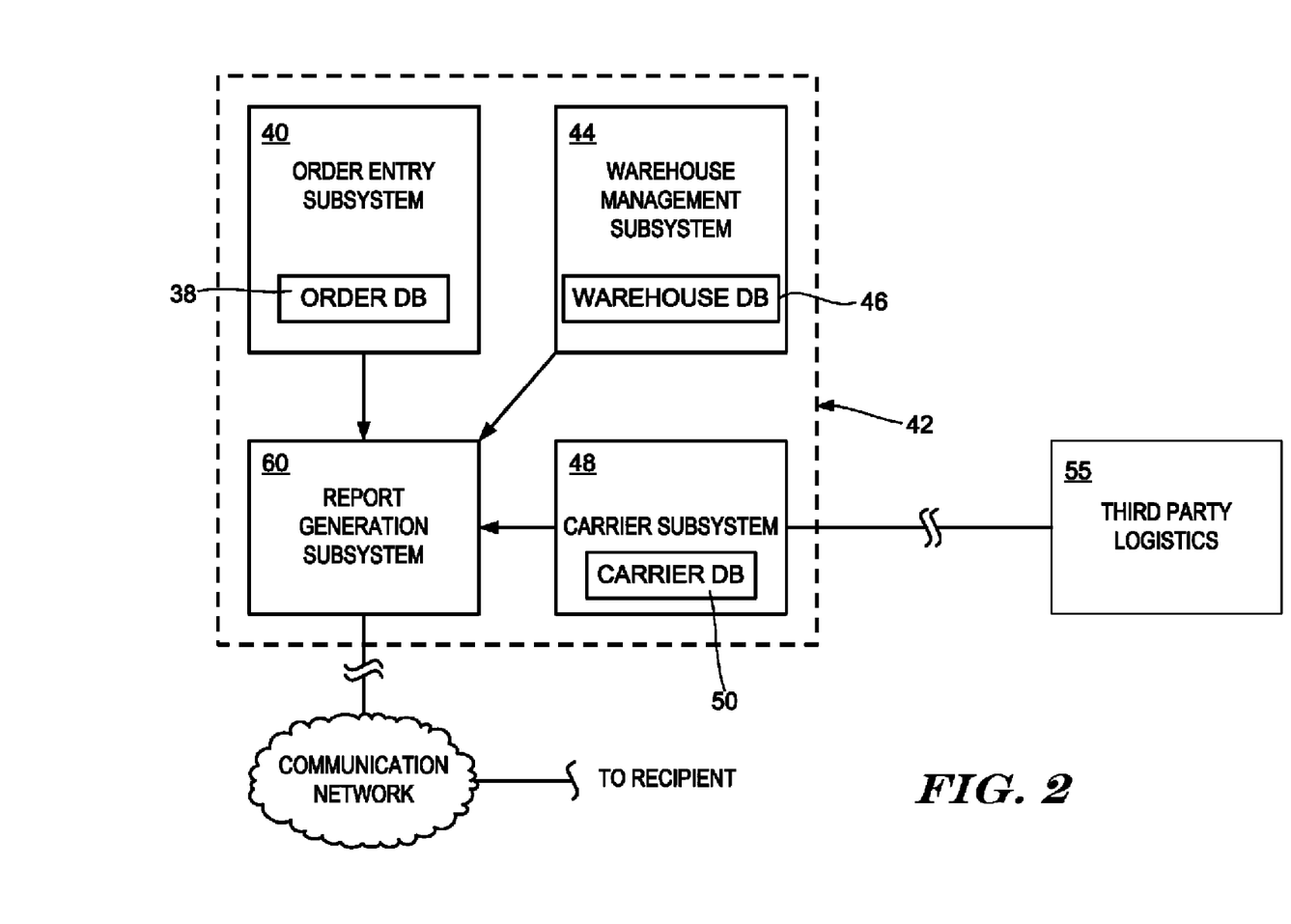
FIG. 2 is an illustrative example of system for monitoring a status of an order placed by a customer for a product to be delivered to a retail location.

Regardless of the manner in which the order information is delivered to the supplier 18, the order information is to be stored in a computer-accessible order database 38 forming part of an order entry subsystem 40 stored on the server 16 or another networked computer-accessible memory as shown in FIG. 2. FIG. 2 illustrates an illustrative arrangement of a system 42 for monitoring the status of an order placed by a customer 12 and generating a report 70 (FIG. 3) of the status to be monitored by a supervisor in a consolidated report format. By storing the order information in the order database 38 on the order server 16, the order information can subsequently be accessed by a plurality of computer terminals 14 networked with the server 16 over the LAN 20. Other authorized parties such as the customer 12, warehouse 22, or any other authorized parties, for example, can also optionally gain access to the order information stored in the order database 38 on the server 16 to review the status of the order as described in detail below.

Order entry subsystem 40 also includes computer readable code that can be executed to thereby cause the order server 16 to serve content to the order terminals 14, customer terminals 34, or a combination thereof, to present an order-entry interface to be displayed for entering the order information can be saved within the order database 38. Examples of the order information to be stored within the order database 38 include, but are not limited to, one or more of an identity of the product, a quantity of the product desired to be delivered, and a requested ship date submitted by the customer 12.

Likewise, a warehouse management subsystem 44 includes a warehouse database 46 for storing warehouse information pertaining to the order placed by the customer 12. Examples of the warehouse information include, but are not limited to, a scheduled load date on which the quantity of the products to be transported to the retail location are to be placed on the trailer to be picked up by a carrier, a scheduled date on which the product will depart from the warehouse 22 en route to the retail location, a scheduled date of delivery of the product to the retail location, a requested ship and/or delivery date requested by the customer 12, and any other information required to fulfill the order placed by the customer 12.

The warehouse information, or at least a portion thereof, can optionally be extracted from the order information entered into the order database 38. According to such embodiments, the warehouse information is automatically transmitted to be stored within the warehouse database 46 in response to entry of the order information into the order database 38. As mentioned above, the order database 38 and the warehouse database 46 can optionally be stored on the same server, different servers or computer-accessible memories, or can even include information to be stored in the appropriate fields within the same database. Examples of warehouse information include a number of each product available for shipping, a number of the product on order and a scheduled date on which the ordered products will arrive at the warehouse 22, products on backorder, late shipments, early shipments, average and total days required to complete and ship an order from the warehouse 22 once the order has been received, and any other information associated with the warehousing of products to be delivered to customers.

A carrier subsystem 48 including a carrier database 50 is provided to store shipping rates of a plurality of various carriers for transporting the products to the retail location, or to any other location desired by the customer 12. The carrier database 50 can optionally be an internal, local database, maintained by or on behalf of the supplier 18 or warehouse 22, storing the last known shipping rates for the various different carriers. The shipping rates and other information stored in the carrier database 50 can optionally be obtained periodically from a third-party logistics provider 55, such as Menlo® Worldwide Logistics ("Menlo") or the like. According to one embodiment, shipping information can transmitted to the carrier subsystem 48 automatically over the WAN 30 by Menlo in response to a request, or periodically, or even occasionally in response to changes in the shipping information previously transmitted, for example. Menlo can return, among other information, the lowest cost carriers available for particular load sizes, ranges, transit times, geographic locality, etc. . . . for transporting the desired quantity of the product to the retail location. Thus, the carrier subsystem 48 can associate low-cost carrier codes with every customer 12 order entered into the order entry subsystem 40.

For embodiments where Menlo returns the carriers identified as being the low-cost carrier ("LCC") for a particular order, the shipping rate for that carrier may optionally be omitted. Instead, Menlo, according to such embodiments, transmits the identity or code of the LCC, but not necessarily the shipping rate for that carrier. The carrier database 50 can also optionally store historical shipping rate information and other known information about each of the carriers to accessed locally (i.e., internally within the warehouse 22 and/or supplier 18, optionally from a server maintained by or on behalf of the warehouse 22 and/or supplier 18 for example). The locally-stored shipping rates can be cross referenced to the various LCCs and associated with those LCCs in the report 70 generated by the report generation subsystem 60 as described below.

Figure 3:
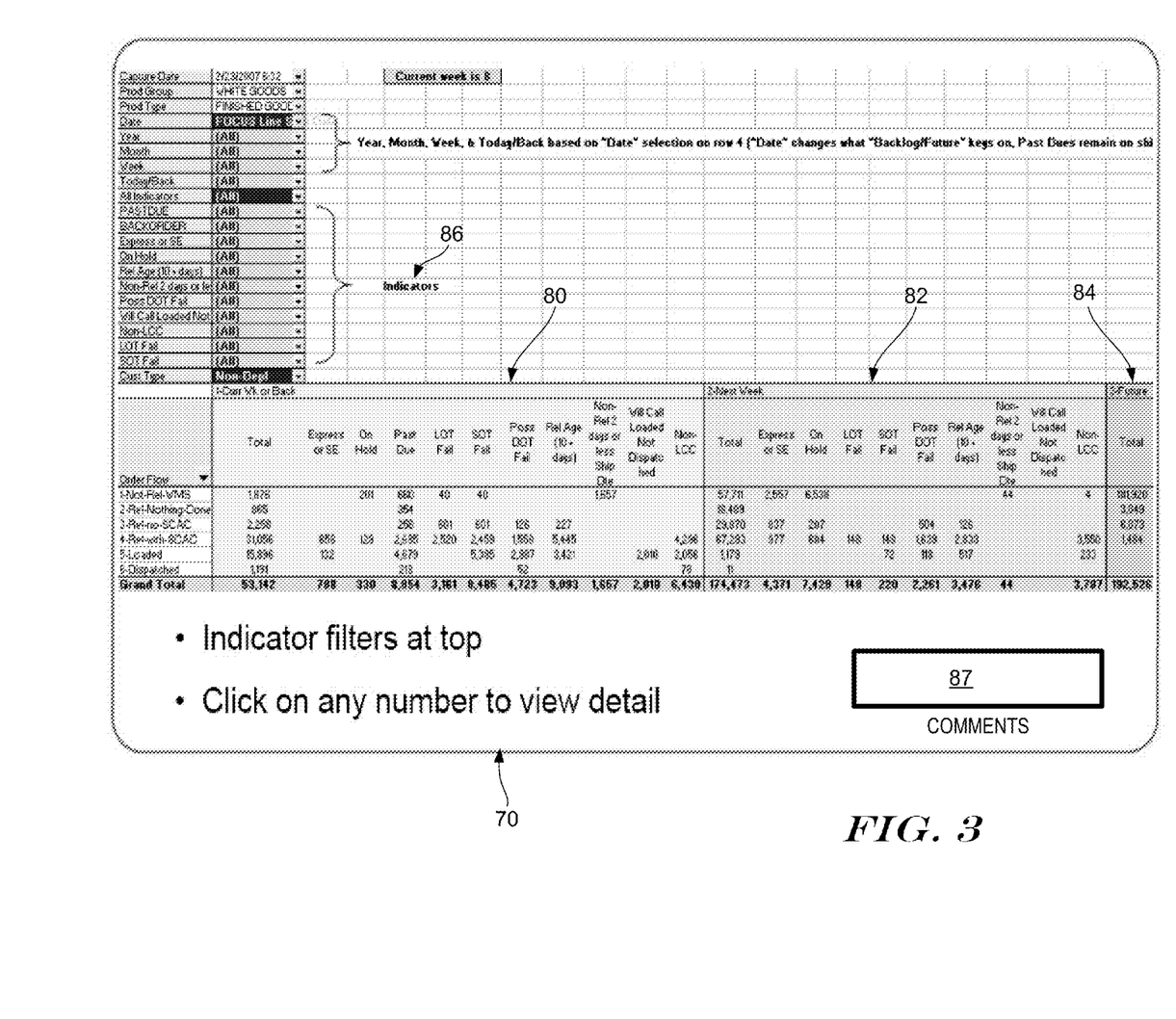
FIG. 3 is an illustrative example of a report generated by a report-generation subsystem.

A report generation subsystem 60 is operative to collect at least a portion of the order information, the warehouse information and the shipping rate and assemble the collected information into a report 70 (FIG. 3). The report 70 displays the portion of the order information, the warehouse information and the shipping rate that was collected as a single, unitary display to enable a supervisor to substantially simultaneously review all such information. Further, the portion of the order information, the warehouse information and the shipping rate to be assembled into the report 70 can optionally be customizable by the intended recipient of the report 70.

Like the order entry subsystem 40 and warehouse management subsystem 44, the report generation subsystem 60 includes computer-readable code that is to be executed by a computer terminal to perform its function (i.e., collect and assemble the desired information into the report 70). FIG. 2 illustrates the report generation subsystem 60 as being integrated into the system 42 for monitoring the progress of the order that resides on at least one of the order server 16 and the warehouse server 28. However, it is to be noted that the report generation subsystem 60 can be a local application residing on any of the order terminals 14, customer terminals 34, warehouse terminals 26, or any authorized computer terminal in for compiling the information to be included in the report 70. Further, the order information, warehouse information, carrier information or any other information to be included in the report 70 can be stored as described above in each of their respective databases, or can be combined in a common database accessible from a common server to be assembled into the unified report 70.

According to an embodiment of a method of monitoring the status of an order the report generation subsystem 60 can acquire some or all of the information contained in one or more of the order entry subsystem 40, the warehouse management subsystem 44, and the carrier subsystem 48 by conducting one or more queries. Each query for information is conducted by the report generation subsystem 60 at about the same time so all information displayed in the report 70 for each order is up to date, and reflects the information for that order corresponding to a common time.

The report generation subsystem 60 assembles the collected information and can optionally also process (e.g., sorting, filtering, cataloging, counting, application of mathematical, time, and/or statistical functions, comparisons, etc.) the orders to be displayed in the report 70 by any portion of the collected information. For example, the orders can be sorted, filtered, or otherwise arranged by the date on which the order was placed, the date on which the products are to be delivered to the retail location, the date on which the products are scheduled to depart the warehouse 22, carrier, a combination thereof, or any other criteria. Such processes can be accomplished in any known manner, such as via formulas, algorithms, artificial intelligence, fuzzy logic, etc. . . . The collected information, once assembled into the report 70, can optionally be stored locally or remotely in a report database on any desired computer-readable medium, including the order server 16, the warehouse server 28, or any of the computerized terminals used to view the report 70. The report 70 can also optionally be transmitted over a communication network (e.g., LAN, WAN 30 or both) as an e-mail attachment to the intended recipient. Accordingly, the report generation subsystem 60 can accept as inputs data from one or more of the order entry subsystem 40, the warehouse management subsystem 44 and the carrier subsystem 48, and can assemble the collected information as a report 70 to be output to be transmitted to the supervisor recipient over at least one of the LANs 20, 24, 32 and optionally the WAN 30.

The collection of the information can be performed by the report generation subsystem 60 itself, or by way of a third-party program, such as, for example, software provided by Cognos® or the like. The information collection can be collected and/or processed in real time, or at discrete time intervals, such as once every two hours, though various other time intervals are contemplated. In one example, when such information is collected and/or processed in a discrete time interval, such as every two hours, the newly-collected information can overwrite the previously existing information included in a prior report. Thus, in this example, every two hours the information in the report 70 is refreshed with the most up-to date information available at that time.

As mentioned above, the locally stored shipping rate information accessible from the carrier subsystem 48 can optionally be associated with the LCC code(s) for each order by the carrier subsystem 48 or the report generation subsystem 60 at a time when the report 70 is to be generated. Thus, even if the logistics provider 55 does not return shipping rates, the expected shipping rates for each order can still be included in the report 70. Further, the report generation subsystem 60 can also optionally compare the shipping rate, expected and/or as returned by the logistics provider 55, to a predetermined cutoff rate specified by at least one of the supplier 18 and the warehouse 22. The cutoff rate is the most expensive rate that the supplier 18 or warehouse 22 will pay for standard shipping, above which the supplier 18 and/or warehouse 22 considers the rate to be a premium shipping rate. If the expected or actual shipping rate is determined by the comparison to exceed the cutoff rate, the report generation subsystem 60 can generate an alert indicating as such. For example, the premium shipping rates in the report 70 can be highlighted or otherwise brought to the attention of the supervisor.

The report generation subsystem 60 can combine all of the collected information into the report 70 shown in FIG. 3, and transmit the report 70 over at least one of the WAN 30, LAN 24 LAN 32, LAN 34 to the end user and grant the end user up to date, and complete access to the information in one report 70. In one example, the information can be presented in a spreadsheet form viewable in a proprietary or third-party software application, such as, for example, Microsoft Excel®, Lotus®, or the like (e.g., viewable in pivot tables, etc.). In one example, the collected information in the report 70, such as that shown in FIG. 3, can be organized and presented into three weekly categories 80, 82, 84, detailing the current week's customer orders, next week's customer's orders, and future customer's orders, respectively. The information in each weekly category 80, 82, 84 can optionally be filtered by an desired indicator 86, which can be selectable as a pull-down menu, to establish criteria the information must meet to be included within the report 70. The report 70 generated by the report generation subsystem 60 can also optionally include a field 87 allowing manually-entered information to be stored in at least one of the order database 38 and the warehouse database 46. The field 87 can be a text entry field for receiving a text entry entered by the supervisory utilizing a computer terminal for example, or any other type of suitable data entry field.

Within each weekly category 80, 82, 84, the information about the various customer orders displayed can include, for example, the current number of unallocated units, allocated units, total number of units, relative number or percentage of units, number of units on hold, number of units back ordered, number of units past due, etc., though various other information is also contemplated. In another example, detailed shipping information about the various customer orders displayed can include, for each of the number of units loaded, dispatched, etc., the total number of units, number of express units, number of units on hold, number of units past due, number of units loaded on time (LOT) or failing, number of units shipped on time (SOT) or failing, number of units delivered on time (DOT) or failing, relative age of the units above/below a threshold, number of units in will-call that are loaded but not dispatched, number of units without an LCC code (e.g., not processed by the carrier subsystem 48), etc., though various other types of information are also contemplated.

Of course, any or all of the foregoing information can be organized per factory, per destination, per product, per product line, per date, per unit of time, etc. Additionally, because all of the information is cross-references, it can be readily sorted by the end-user within the spreadsheet/pivot table. For example, the data can be filtered or sorted according to the date on which the information in the report 70 was collected by the report generation subsystem 60, product group, product type, date, year, month, week, and other specific indicators 86 such as orders that are past due, back order, express, on hold, relative age, potential DOT failure (e.g., based upon a comparison of the current date, due date, and transit time), units on will-call loaded but not dispatched, units without an LCC code, units LOT or failing, units SOT or failing, customer 12 name, customer 12 type, etc., though various other sorting fields are also contemplated. Further still, for a relatively greater detail view, each facility (e.g., each supplier 18, warehouse 22, retail location, etc. . . . ) can have an individual subset of information in the report 70 that can display, for example, specific orders, order numbers, dates, amounts, costs, shipment load numbers, customer numbers, actual ship dates, planned ship dates, status, etc. . . . , though various other information is also contemplated. Thus, an end user can use the sorting functionality to "drill-down" deeper into the included information to more fully understand the status of the order. In addition or alternatively, some or all of the fields can be altered by the end user to permit experimentation with the data so as to allow better informed problem solving. In addition or alternatively, any or all of the generated reports can utilize exception-based reporting, wherein particular fields, data, etc. is or is not included in report 70 to help a user filter out "system noise" to better view the underlying issues at hand.

In one example, the method and system can permit a user to monitor or audit the levels of an item within the warehouse 22, such as on shelves, on pallets, in quarantine, or at another location within the warehouse 22, to determine whether sufficient levels of inventory are on hand or expected, whether there will be an undesirable variation in the inventory levels, and/or when to send an order to replenish. For example, when an order is loaded on a truck, the warehouse 22 operator may notify the warehouse management subsystem 44 that a pallet-load of a particular item has been transferred from the warehouse 22. As such, the entry will become part of the report 70 after the next database refresh (e.g., every two hours). Thus, a user can view the report 70 data and analyze it to determine whether there is likely to be an undesirable variation in inventory levels and/or when to order addition stock of that item. As another example, the system 42 can detail and track the number of units available for shipment as of a particular date or range of dates, as compared to the total number ordered, so as to determine a percentage of allocated stock.

In another example, the system 10 can analyze or audit current and historical inventory data to detect trends such as deviations between planned replenishment and actual replenishment and to build a predictive model of future inventory needs. These trends and predictions can be determined using various methods, such as linear regression, classification and regression trees, or other stochastic algorithms. For example, the system 10 can compare the promised and actual delivery time for various quantities of inventory delivered in the past to generate predictions for actual delivery dates and quantities for future replenishment activities that are planned but not yet completed.

In yet another example, the system 10 can use the report information along with the LCC information within the carrier subsystem 48 to determine if any projected transportation systems are being operated inefficiently, and predict shipping delays. For example, the system 10 can use the data to determine if goods are being shipped to a retail location from a distant warehouse 22, instead of from a closer (and generally cheaper) local or regional warehouse 22. Thus, a supervisor viewing the report 70 can quickly view all information required to determine the inefficient warehouse 22 usage from a single report 70, and provide different shipping arrangements. Additionally, the report information along with the LCC information can be used to determine the frequency of non-LCC carriers (e.g., expensive premium carriers) for use in scaling back their use.

Figure 4:
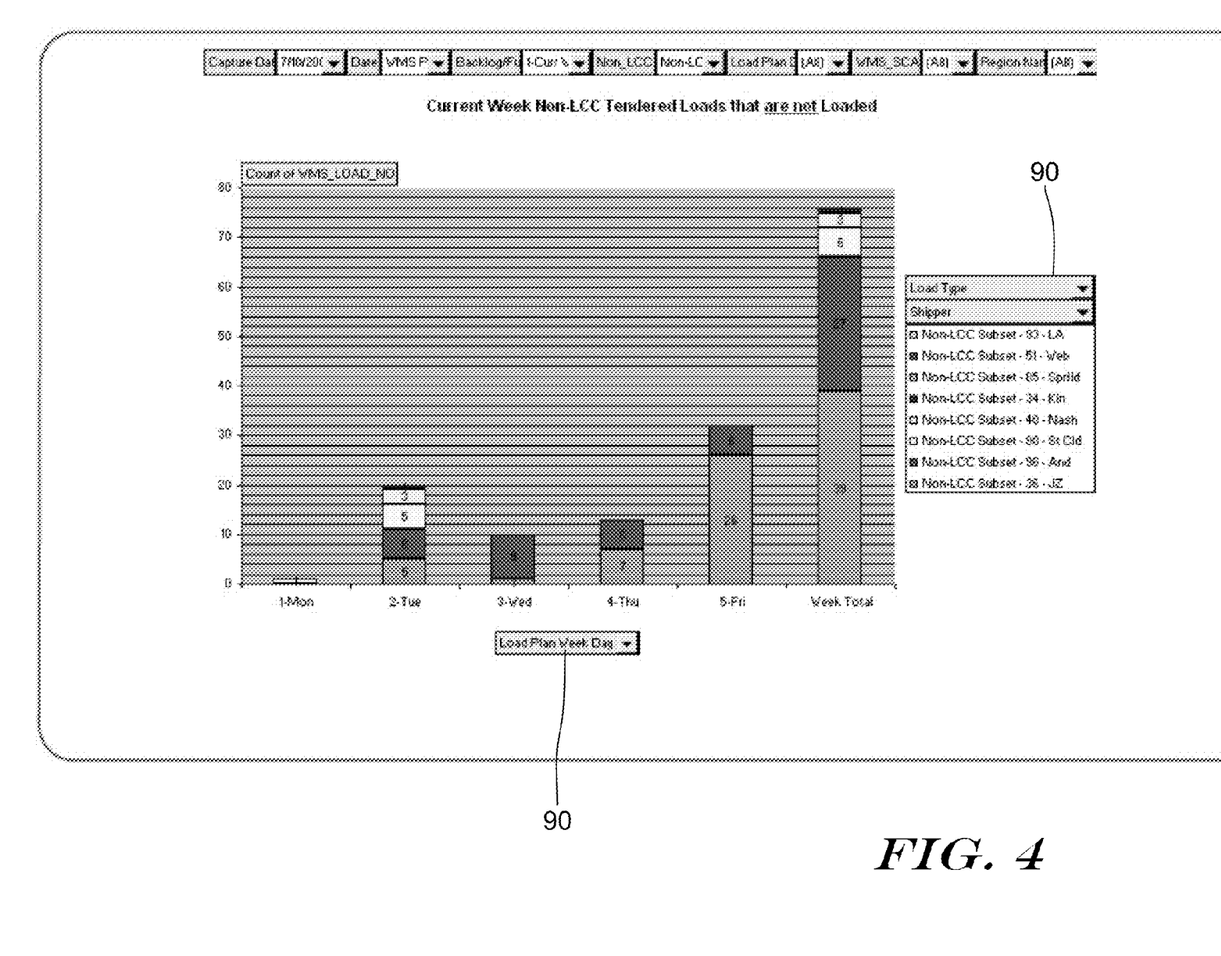
FIG. 4 is an illustrative example of a graphical depiction of a information collected by a report generation subsystem.

In addition or alternatively, any or all of the data can be presented in specialized pictorial graphs, charts, etc. For example, a graphical chart such as that shown in FIG. 4, can be generated that displays, for a particular time frame (e.g., the current week), the number of loads tendered with premium (i.e., non-LCC or high cost) carriers versus the particular day of the week to help determine shipping problems. The information can be organized in a bar chart, line chart, pie chart, or the like. In addition or alternatively, the graphs, charts, etc. can illustrate trends in the data, and/or can even predict future performance of a particular data set. Even further still, the charts can include interactive/dynamic functionality, such as via a menu system 90 that can permit a user to customize the type or amount of data displayed in a particular type of graph, chart, etc. Thus, for example, where a chart shows a particular trend or interest point (e.g., an unexpected spike or drop in supply or demand, etc.), the interactive nature of the chart can permit a user to "drill-down" deeper into the underlying information to analyze the cause of the trend or interest point that can lead to some corrective action. In addition or alternatively, the charts or graphs can be adapted to be useable and viewable on an interactive remote conference call type of system 10, such as over the internet via a third-party program (e.g., Web-X or the like).

Figure 5:
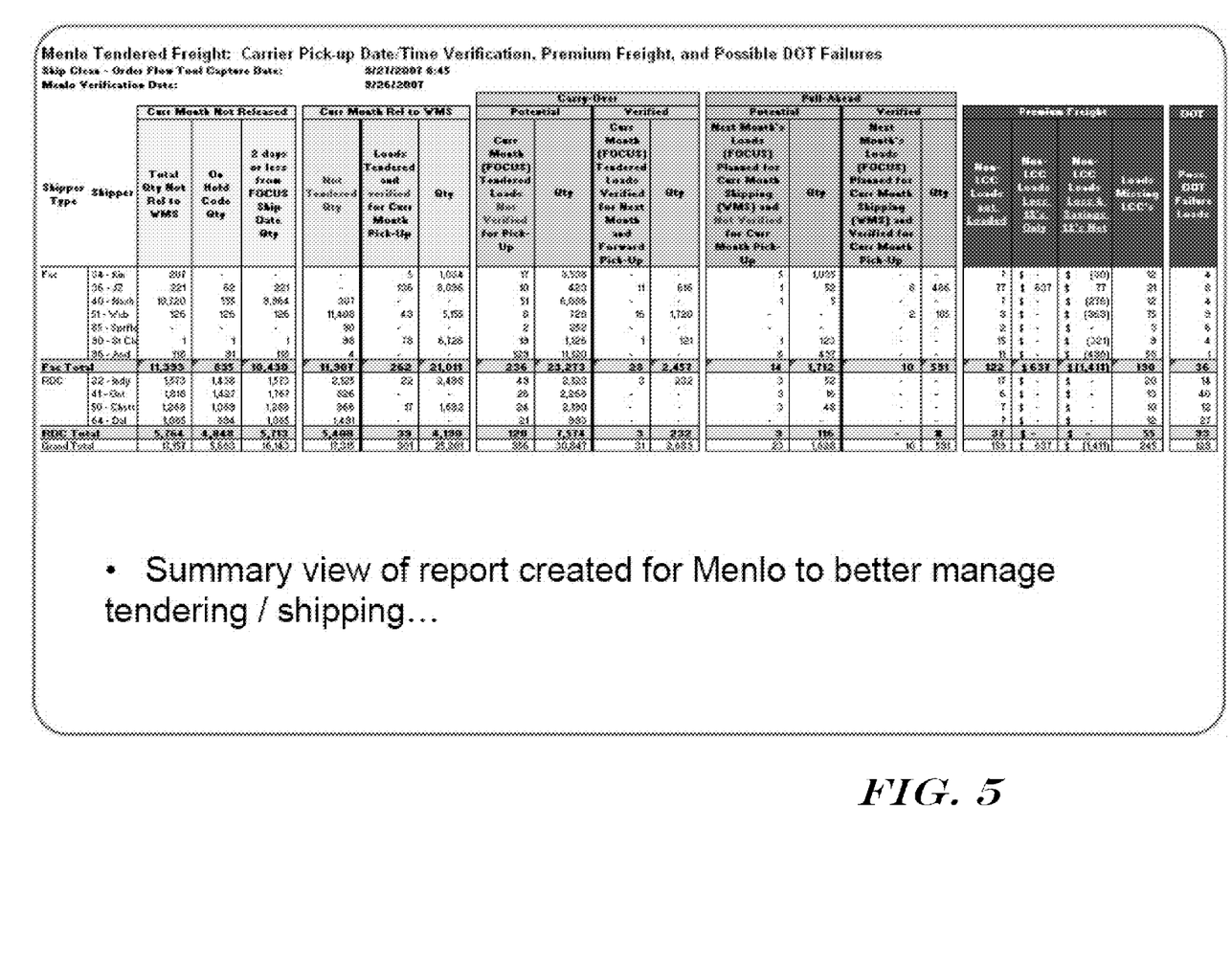
FIG. 5 is an illustrative example of a report including information collected by a report generation subsystem to rate shipping of a product ordered by a customer from a supplier.

In addition or alternatively, the system 10 and method can be adapted to generate summaries or report cards for particular aspects of the overall data. In one example, the system 10 can be adapted to generate a summary or report card, an example of which is shown in FIG. 5, for the freight carrier or contractor. In FIG. 5, the summary includes information detailing number of orders shipped, on hold, not released by the supplier 18 to the warehouse 22 less than two days from the ship date, loads tendered, loads tendered but not verified for pick-up, loaded remaining unloaded, loads missed, possible DOT failures, amount of money lost, etc., though various other information is also contemplated. The summary can include past, present, future, and/or predicted data. Of course, other summary data can also be generated. For example, summaries can be generated for items shipped the same day as loaded for transport, orders remaining to ship that are not tendered with a carrier, factory warehouse 22 loading schedules, and/or demand of product per week that is not released to a warehouse 22 for shipping, though various other summaries are also contemplated.

In another example, such summaries can be utilized to compare between two or more factories, warehouses, distribution centers, distribution channels, etc. Thus, for example, particular aspects of two different factories can be directly compared against each other. In one example, two factories can be compared against each other with regards to their respective warehouse loading schedules relative to particular products, customers, ship dates, deadlines, etc. This comparison can be beneficial in determining why a particular factory is producing more or less than another, shipping problems, backlogs, etc. Additionally, the summary can be useful in determining corrective actions, new strategies, etc.

In addition or alternatively, the system 10 and method can be adapted to provide various other functionality. In one example, the system 10 can be adapted to provide information regarding loading capacity by day by warehouse 22 to compare to Customer demand requirements for quickly labor planning solutions. In another example, the system 10 can be adapted to provide information regarding disruption free performance (DFP) codes that may currently exist within the warehouse management subsystem 44 to permit warehouse managers to quickly summarize and analyze these failure codes for corrective action. In yet another example, the method and system 10 can be adapted to provide information regarding warehouse management subsystem 44 open order quantities per SKU to capture planned fill rate failures for planned loading and actual fill rate failures for dispatching.

In addition or alternatively, the system 10 and method can be adapted to generate and display any of all of the report information and/or the aforedescribed graphs, charts, etc. for use on the internet For example, the system 10 and method can include a Web server adapted to generate HTML code or the like and accompanying image files for displaying the information communicated to the recipient over the WAN 30. Thus, the supplier 18, the warehouse 22, management, customers, carriers, and other authorized individuals can gain ready access to information regarding various customer orders from remote locations. In such a remote-access internet system, each user (e.g., employees of the supplier 18, customer 12, warehouse 22, carrier, etc.) can be assigned a user ID and password to enable the system 10 to place different security restrictions on each user. Thus, each user can be restricted to viewing only particular data. For example, a customer 12 can be restricted to viewing only data pertaining to their own orders.

The system 10 and method can include internet compatibility protocols, such as the Lightweight Directory Access Protocol (LDAP), the Transport Control Protocol/Internet Protocol (TCP/IP) suite of protocols, the Hypertext Transport Protocol (HTTP), the Wireless Application Protocol (WAP), and/or other suitable communication protocols. These communication protocols can permit the system 10 to communicate with a remote client application (e.g., an Internet user). In one example, the client application is a browser application capable of displaying Web pages retrieved from Web server using standardized Web page addressing formats. The browser can display various types of content in addition to Web pages. Moreover, the location of the content may be represented with a variety of addresses, such as Uniform Resource Locators (URLs) and Uniform Resource Identifiers (URIs), or the like.

The Web server can also generate HTML code representing the charts, graphs, etc. In one example, the HTML code contains visible HTML elements and hidden HTML elements (i.e., a visible HTML element is displayed, while a hidden HTML element is not displayed but can contain information about an event or action). The HTML code generated by the Web server contains elements that register scripting language functions to handle events. In one example, the scripting language functions can be JavaScript functions. Interactive functions are triggered by user actions, which the browser sends, e.g., on mouse actions while the mouse cursor is positioned within the chart or graph area. The HTML code generated by the Web server can also contain elements that are used for the interaction dialog on the client side (browser-side), such as for interacting with the graph or chart, or altering the appearance of the graph or chart.

The systems and techniques described here can be implemented in digital electronic circuitry (or even analog electronic circuitry), or in computer hardware, firmware, software, or in combinations thereof. The system and method can be implemented in a computer-readable code stored on a tangible computer-accessible medium, e.g., on a machine-readable storage device or in a propagated signal, for execution by a programmable processor; and the method steps can be performed by a programmable processor executing a program of instructions to perform functions by operating on input data and generating output. The foregoing can be implemented advantageously in one or more computer programs that are executable on a programmable computer system including at least one programmable processor coupled to receive data and instructions from, and to transmit data and instructions to, a data storage system, at least one input device, and at least one output device.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The basic elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented and/or executed on a computer having a display device such as a CRT (cathode ray tube) or LCD (liquid crystal display) monitor for displaying information to the user and a keyboard and a pointing device such as a mouse, trackball, or the like, or even a voice command system, by which the user can provide input to the computer.

The invention can be implemented in a computer system that includes a back-end component, such as a data server or mainframe, or that includes a middleware component, such as an application server, intranet server, or an Internet server, or that includes a front-end component, such as a client computer having a graphical user interface or an Internet browser, or any combination of them. The components of the system 10 can be connected by any form or medium of digital data communication, including various forms of wired or wireless communication.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of monitoring a status of an order placed by a customer for a product produced by a supplier to be delivered to a retail location, the method comprising:
    collecting, using a computer system with access to a computer-readable medium accessible over a communication network, order information about the order from an order database included as part of an order routing system of the supplier and adding the order information to an electronic record relating to the order, wherein the order information includes information that identifies at least one of: the product to be delivered, a quantity of the product desired to be delivered, and a requested ship date;
    collecting, using the computer system, warehouse information from a computer-accessible warehouse database in communication with a warehouse management system and adding the warehouse information to the electronic record to establish a relationship between the order information collected and the warehouse information collected for the order, wherein the warehouse information comprises at least one of: a scheduled load date, a scheduled date of departure of the product from the warehouse, and a scheduled date of delivery of the product to the retail location;
    including in the electronic record relating to the order, a low-cost carrier offering a lowest shipping rate relative to shipping rates offered by a group of available carriers for transporting the quantity of the product to the retail location;
    using the computer system, comparing the lowest shipping rate offered by the low-cost carrier to a predetermined cutoff rate that has been previously approved as a maximum acceptable shipping rate that is acceptable to at least one of the supplier and the warehouse as a standard shipping rate, above which supervisory approval of the lowest shipping rate as a premium shipping rate is required;
    in response to a determination resulting from said comparing that the lowest shipping rate exceeds the cutoff rate, providing an alert for the order to indicate that the lowest shipping rate exceeds the cutoff rate;
    generating a report that displays the order information, the warehouse information, the low-cost carrier, the alert and the lowest shipping rate associated with the order corresponding to a predetermined time; and
    transmitting the report to be viewed in real-time by a supervisor.

2. The method of claim 1, wherein said collecting order information comprises retrieving the order information from the computer-accessible order database maintained on behalf of the supplier over a wide-area communication network.

3. The method of claim 1, wherein said collecting warehouse information comprises retrieving the warehouse information from the computer-accessible warehouse database maintained on behalf of the warehouse over a wide-area communication network.

4. The method of claim 1, wherein said collecting the order information, said collecting the warehouse information and said including in the electronic record relating to the order, the low-cost carrier are all performed within a common time period to bring all of the order information, warehouse information and the low-cost carrier in the report up to date.

5. The method of claim 4, wherein said collecting the order information, said collecting the warehouse information and said including in the electronic record relating to the order, the low-cost carrier are periodically performed at regular intervals.

6. The method of claim 5, wherein said generating the report is performed during each regular interval and the order information, warehouse information and low-cost carrier are refreshed when the report is generated.

7. The method of claim 1, wherein the report is customizable to display a portion of at least one of the order information and the warehouse information desired by the supervisor.

8. The method of claim 1 further comprising filtering a plurality of orders as a function of one or more dates selected from: a ship date requested by the customer, the scheduled load date, the scheduled date of departure of the product from the warehouse, and the scheduled date of delivery of the product to the retail location.

9. A computerized system for fulfilling an order placed by a customer for a product produced by a supplier to be delivered to a retail location, the computerized system comprising:
   an order-routing subsystem for presenting an order-entry interface to collect order information about the order to be transmitted to the supplier and store the order information in a computer-accessible order database;
   a warehouse management subsystem comprising a computer-accessible warehouse database for storing warehouse information authorized by the supplier and transmitted to the warehouse storing a sufficient quantity of the product ordered by the customer, wherein the warehouse information comprises at least one of: a scheduled load date, a scheduled date of departure of the product from the warehouse, and a scheduled date of delivery of the product to the retail location;
   a carrier subsystem comprising a carrier database storing a shipping rate of a plurality of carriers for transporting the product ordered by the customer to the retail location, wherein said carrier subsystem performs a comparison of a lowest available shipping rate offered by at least one of the carriers to a cutoff rate that has been previously approved as a maximum acceptable shipping rate; and
   a report generation subsystem for collecting at least a portion of the order information, the warehouse information and the shipping rate and generating a report displaying the portion of the order information, the warehouse information and the shipping rate collected in a single display to be substantially simultaneously reviewed by a supervisor, wherein, in response to a determination resulting from said comparison that the lowest available shipping rate exceeds the cutoff rate, the report generation subsystem generates an alert to request supervisory approval of the lowest available shipping rate by at least one of the supplier and the warehouse as a premium shipping rate before the order is to be shipped.

10. The computerized system of claim 9, wherein the report generation subsystem collects the portion of the order information, the warehouse information and the shipping rate periodically, at regular intervals, and updates the report to reflect changes to the portion of the order information, the warehouse information and the shipping rate that have occurred subsequent to generation of a previous report.

11. The computerized system of claim 9, wherein the report generated by the report generation subsystem is transmitted over a communication network to be displayed by a supervisory computer and includes a field allowing manual information entry to be stored in at least one of the computer-accessible order database and the computer-accessible warehouse database.

12. The computerized system of claim 11, wherein the field is a text entry field for receiving a text entry entered with the supervisory computer.

13. The computerized system of claim 9, wherein the order-routing subsystem and the warehouse management subsystem are operatively connected to communicate electronically over at least one of a private communication network and a public communication network.

* * * * *